(12) United States Patent
Bacolas

(10) Patent No.: US 11,778,954 B2
(45) Date of Patent: Oct. 10, 2023

(54) PLANTER SYSTEM AND METHODS FOR USING SAME

(71) Applicant: Eric M. Bacolas, Brooklyn, NY (US)

(72) Inventor: Eric M. Bacolas, Brooklyn, NY (US)

( * ) Notice: Subject to any disclaimer, the term of this patent is extended or adjusted under 35 U.S.C. 154(b) by 40 days.

(21) Appl. No.: 16/736,809

(22) Filed: Jan. 7, 2020

(65) Prior Publication Data

US 2020/0221646 A1    Jul. 16, 2020

Related U.S. Application Data

(60) Provisional application No. 62/789,320, filed on Jan. 7, 2019.

(51) Int. Cl.
*A01G 9/02* (2018.01)
*A01G 27/00* (2006.01)
(Continued)

(52) U.S. Cl.
CPC .............. *A01G 9/02* (2013.01); *A01G 9/247* (2013.01); *A01G 27/003* (2013.01); *A01G 27/02* (2013.01)

(58) Field of Classification Search
CPC .......... A01G 9/02; A01G 9/247; A01G 9/022; A01G 9/023; A01G 9/028; A01G 27/00;
(Continued)

(56) References Cited

U.S. PATENT DOCUMENTS 4,157,770 A * 6/1979 Roos .................... A01G 27/001
                                                     222/650
4,265,050 A * 5/1981 Buescher ............... A01G 27/02
                                                        47/79
(Continued)

FOREIGN PATENT DOCUMENTS

AU         2015100899 A4     8/2015
KR       20080046431 A  *  11/2006
(Continued)

*Primary Examiner* — Joshua D Huson
*Assistant Examiner* — Edgar Reyes
(74) *Attorney, Agent, or Firm* — BEKIARES ELIEZER LLP

(57) ABSTRACT

Disclosed herein are a planter apparatus and system. In one aspect, a planter system and apparatus can include one or more planting compartments, a water collection reservoir in fluid communication with at least one of the one or more planting compartments, and a water drainage system configured to drain water from one planting compartment into another planting compartment, drain water from one planting compartment into the water collection reservoir, or drain water from inside the water collection reservoir to outside the water collection reservoir, or a combination thereof. The planter apparatus may be further configured to include a water flow control component configured to: open for the flow of water through the water drainage system, and close, thus stopping the flow of water through the water drainage system based on the engagement and disengagement of a water drainage stopper mechanism at the base of the water drainage stopper. Also disclosed herein are methods of using the disclosed planter devices and systems.

18 Claims, 9 Drawing Sheets

(51) Int. Cl.
*A01G 9/24* (2006.01)
*A01G 27/02* (2006.01)

(58) Field of Classification Search
CPC ...... A01G 27/02; A01G 27/003; A01G 31/06; A01G 2031/006
USPC .......................................... 141/351, 360, 362
See application file for complete search history.

(56) References Cited

U.S. PATENT DOCUMENTS

| | | | |
|---|---|---|---|
| 6,385,899 B1 * | 5/2002 | Treganza | A47G 7/041 47/39 |
| 7,024,818 B2 | 4/2006 | Maniscalco et al. | |
| 8,181,387 B2 * | 5/2012 | Loebl | A01G 9/249 47/18 |
| 2005/0050798 A1 | 3/2005 | Eakin | |
| 2006/0277825 A1 * | 12/2006 | Sanders | A01G 9/04 47/71 |
| 2015/0101540 A1 * | 4/2015 | Allen | A01K 63/006 119/247 |
| 2017/0105368 A1 * | 4/2017 | Mehrman | A01G 27/005 |
| 2017/0238479 A1 * | 8/2017 | Lipani | A01G 13/04 |
| 2018/0042191 A1 * | 2/2018 | Blackburn | A01G 31/06 |
| 2019/0141923 A1 * | 5/2019 | Ray, Jr. | F21V 29/503 47/62 R |
| 2019/0200541 A1 * | 7/2019 | Park | A01G 9/042 |

FOREIGN PATENT DOCUMENTS

| | | | | |
|---|---|---|---|---|
| NL | 9201069 A | * | 1/1994 | ............ A01G 9/022 |
| WO | 2014134662 A1 | | 9/2014 | |

* cited by examiner

PLANTER SYSTEM AND METHODS FOR USING SAME

CROSS REFERENCE TO RELATED APPLICATION

This application claims the benefit of priority to U.S. Provisional Patent Application No. 62/789,320, filed Jan. 7, 2019, which is hereby incorporated herein by reference in its entirety.

FIELD OF DISCLOSURE

The present disclosure generally relates to planter apparatuses and systems.

BACKGROUND OF THE DISCLOSURE

For plants to naturally grow successfully, they need consistent sun, nutrients, water and also appropriate drainage. In nature, the ideal watering arrangement is allowing water to thoroughly soak into the soil, reach the roots, and then continue to drain such that plant roots do not remain sitting in water for extended periods of time. Additionally, as plants and their roots grow, the threat of becoming rootbound can contribute to a plant becoming unhealthy due to the roots displacing soil, and the subsequent tangling of the roots causing stress on the plant, and depriving the plant of adequate nutrients, water, and/or food. These situations are exacerbated in planting containers due to limited volume and inadequate drainage. Existing planters have made attempts to solve these problems with limited efficacy. Accordingly, there remains a need for improved planter systems that address the aforementioned challenges of growing plants in containers. This need and other needs are satisfied by the various aspects of the present disclosure.

BRIEF OVERVIEW

A planter system and apparatus may be provided herein. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description. In accordance with the purposes of the disclosure, as embodied and broadly described herein, the disclosure, in one aspect, relates to a planter system comprising: a planter apparatus comprising: one or more planting compartments, a water collection reservoir in fluid communication with at least one of the one or more planting compartments, and a water drainage system configured to drain water from one planting compartment into another planting compartment, drain water from one planting compartment into the water collection reservoir, and/or drain water from inside the water collection reservoir to outside the water collection reservoir. In further aspects, the planter system and apparatuses can include an external casing or panels that can be removed or replaced to change the physical appearance of the planter.

In further aspects, the disclosure also relates to methods for using the disclosed planter systems and apparatuses.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
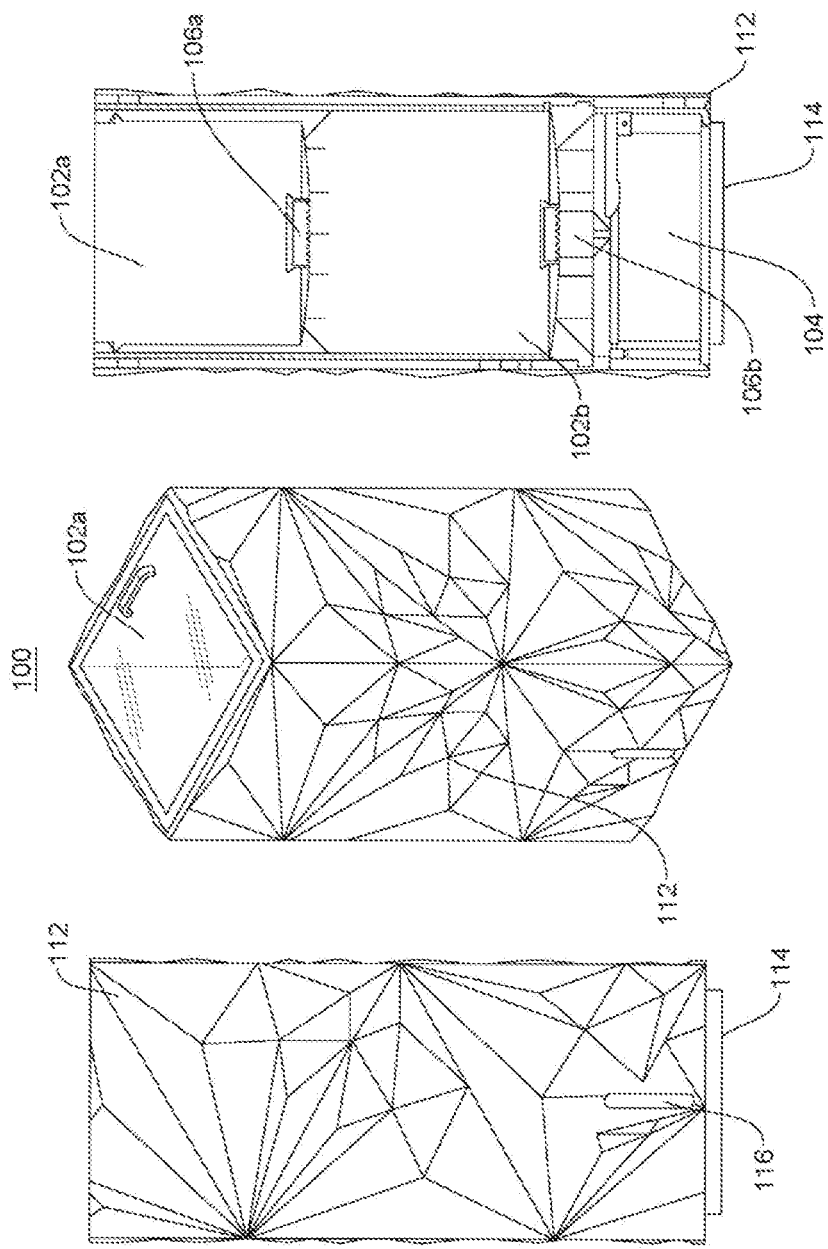
FIG. 1 shows a depiction of a nested planter device in accordance with an exemplary embodiment of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of a planter device, embodiments of the present disclosure are not limited to use only in this context. The present disclosure can be understood more readily by reference to the following detailed description of the disclosure and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived grammatical organization or punctuation; and the number or type of aspects described in the specification.

Disclosed are the components to be used to manufacture the disclosed devices, systems, and articles of the disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

I. Planter Apparatus And System

Consistent with embodiments of the present disclosure, a planter system and apparatus may be provided. This overview is provided to introduce a selection of concepts in a simplified form that are further described below. This overview is not intended to identify key features or essential features of the claimed subject matter. Nor is this overview intended to be used to limit the claimed subject matter's scope. The disclosed planter system and apparatus may be used by individuals to more effectively and aesthetically grow plants in indoors and/or outdoors.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

As briefly described above, the present disclosure relates, in various aspects, to planter apparatuses and planter systems comprising the planter apparatuses. In one aspect, the present disclosure provides a planter system comprising at least one planter apparatus. In further aspects, the planter apparatus may comprise one or more planting compartments, a water collection reservoir in fluid communication with at least one of the one or more planting compartments; and a water drainage system configured to drain water from one planting compartment into another planting compartment, drain water from one planting compartment into the water collection reservoir, or drain water from inside the water collection reservoir to outside the water collection reservoir, or a combination thereof.

In various aspects, the disclosed planter systems and apparatuses may employ or otherwise comprise a water drainage system configured to drain water from one planting compartment into another planting compartment, drain water from one planting compartment into the water collection reservoir, or drain water from inside the water collection reservoir to outside the water collection reservoir, or a combination thereof. In further aspects, the planter apparatus and/or water drainage system comprises at least one flow control component. In some aspects, a plurality of flow control components may be utilized. In yet further aspects, a flow control component may be configured to drain water from one planting compartment into another planting compartment. In still further aspects, a flow control component may be configured to drain water from one planting compartment into the water collection reservoir. In still further aspects, a flow control component may be configured to drain water from inside the water collection reservoir to outside the water collection reservoir.

In further aspects, the water drainage system may comprise a flow control component comprising a drain and a valve configured to control a flow of water flowing from the one or more planting compartments by moving a valve position from an open position to a closed position. In still further aspects, the flow control component can comprise an actuator in mechanical communication with the valve and configured to actuate the valve from an open position to a closed position and/or from a closed position to an open position. In yet further aspects, the open position may be configured to allow for the flow of water through the water drainage system, and the closed position is configured to stop the flow of water through the water drainage system based on the engagement and disengagement of the flow control component.

In further aspects, the water collection reservoir can comprise a drawer configured to be removably inserted into the planter apparatus. In still further aspects, the drawer can comprise an elongated member and/or paddle configured to cause the valve position to move from the closed position to the open position by actuating the actuator when the drawer is inserted into the planter apparatus. In yet further aspects, the water collection reservoir may comprise a drawer paddle configured to engage and disengage the flow control component. In even further aspects, the water collection reservoir may comprise a water gauge for showing a water level within the water collection reservoir. In still further aspects, the flow control component used in the present invention may be configured to move the valve position from the open position to the closed position when the drawer is removed from the planter apparatus. In some aspects, the valve may be configured to be the closed position in the absence of engagement of the actuator is configured to allow for the flow of water through the water drainage system, and the closed position is configured to stop the flow of water through the water drainage system based on the engagement and disengagement of the flow control component.

In various embodiments, the planter systems and apparatuses may be configured for indoor and outdoor uses. In such embodiments, the water collection reservoir may further a flow control component configured to drain water from inside the water collection reservoir to outside the water collection reservoir. The flow control component may comprise a drain and a valve or stopper configured to control or allow water to drain out from the water collection reservoir such as by removing the stopper or moving a valve position from an open position to a closed position. To this end, when the planter is being use in an outdoor setting, the stopper can be left off or the valve positioned in the open setting to allow continuous draining from the water collection reservoir.

In various aspects, the one or more planting compartments may be configured in at least one of: a nested configuration, an interlocking configuration, and a stacked configuration. In further aspects, the planter apparatus may comprise a plurality of planting compartments. In yet further aspects, a planting compartment may comprise side and bottom walls defining an interior space having a predetermined volume. In still further aspects, a planting compartment of the present invention may be connected and/or in fluid communication to at least one of: another planting compartment or water collection reservoir. In even further aspects, at least one planting compartment comprises a drain disposed on the bottom wall and configured to allow flow of water from within the planting compartment into another planting compartment.

In various aspects, the plurality of planting compartments may be configured to connect to one another in a nested configuration, an interlocking configuration, and a stacked configuration. In further aspects, each of the plurality of planting compartments can have different volumes. For example, in some aspects, the planter apparatus can have a first planting compartment configured to nest or fit within a second planting compartment. In further aspects, the first planting compartment can be in fluid communication with the second planting compartment. In yet further aspects, the second planting compartment can be in fluid communication with the water collection reservoir. In even further aspects, the second planting compartment can be in fluid communication with the water collection reservoir. In some aspects, the second planting compartment can comprise a flow control component disposed on a bottom wall, the flow control component comprising a drain and a valve configured to control a flow of water flowing from the second planting compartment into the water collection reservoir by moving a valve position from an open position to a closed position. In other aspects, the flow control component can comprise an actuator in mechanical communication with the valve and configured to actuate the valve from a closed position to an open position to allow flow of water from within the second planting compartment.

In further aspects, the planter apparatus may comprise a housing or casing for housing one or more apparatus components, such as one or more planting compartments, water collection reservoir and water drainage system. In still further aspects, the housing or casing may be configured for containing the planting compartments and/or water collection reservoir. In yet further aspects, the housing can be any shape, and preferably is sized and shaped to allow for plant growth. The housing can be any shape, and preferably is in the shape of a three-dimensional polygon and the housing walls define an interior space or interior sections for containing the elements of the invention. Any other shape (as used herein, the term shape is used in the broad sense of three-dimensional works) may be employed, so long as the shape is large enough and structured so as to be able to contain the various working components of the invention as more fully disclosed herein. The housing may be a generally hollow structure sized to contain one or more plant media containers and water collection reservoir. In yet further aspects, the components can be all housed within the housing such that they are protected from, for example, for inadvertent damage or external elements. In even further aspects, the housing can be comprised of plastic, plastic composite, reinforced plastic, wood, metal, metal composite, or combinations thereof. In still further aspects, the plastic can comprise polypropylene, resin, polyethylene, impact resistant plastic, or the like.

In further aspects, the planting compartment may be configured to be detachably connected or inserted into the planter apparatus. The planting compartment may comprise a planting container and/or media container, and can be any conventional container capable of storing plant media, such as soil, and supporting plant life. In still further aspects, the media container may be a disposable or replaceable container or the like. In even further aspects, the plant media can comprise any desired solid and/or powdered media. In even further aspects, the media can comprise soil, dirt, sand, peat moss, bark mulch, coir, gravel, vermiculite, perlite, and combinations thereof.

In further aspects, the planter apparatus may further comprise an outer shell and/or panels. In some aspects, the outer shell and/or panels may be configured to removably attach to an outer surface of the housing or casing. In other aspects, the outer shell and/or panels may be integrated with or otherwise comprise an outer surface of the housing or casing. In still further aspects, the outer shell may be an external sleeve that slide over the plant apparatus or individual panels that attach to the outside surface, for example as a puzzle to completely cover the outside of the planter apparatus housing. In either configuration the outer shell can provide numerous options to change the exterior look based on individual user's preferred design aesthetics to match home décor. In still further aspects, the outer shell can be comprised of the same or different material that plant apparatus. In even further aspects, the outer shell can be comprised of plastic, plastic composite, reinforced plastic, metal, metal composite, or combinations thereof. In still further aspects, the plastic can comprise polypropylene, impact resistant plastic, or the like.

In further aspects, the system may further comprise at least one moisture sensor configured to determine moisture data associated with at least one planting compartment. In still further aspects, the system may further comprise at least one water level sensor configured to determine water level data associated with the water collection reservoir. In even further aspects, the system may comprise a controller communicatively connected to the sensors and configured to at least one of: communicate moisture data and/or water level data, or control operation of the valve based at least on at least one of the moisture data or water level data.

In further aspects, the moisture sensor may be configured to communicate a notification upon meeting predetermined moisture criteria associated with one or more planting compartments. In still further aspects, the water level sensor may be configured to communicate a notification upon meeting predetermined water level criteria associated with the water collection reservoir. In yet further aspects, the controller may be configured to communicate a notification upon meeting predetermined criteria; wherein predetermined criteria may be based on one or more of moisture data received from a moisture sensor or water level data received from a water level sensor. In some aspects, the controller may be configured to cause the valve position to be in a closed position when water level data received from the at least one water level sensor is above a predetermined threshold.

In further aspects, planter system may comprise a display unit configured to show information related to planter apparatus status, settings, parameters, or performance, or a combination thereof. In still further aspects, the display unit may be further configured to generate a user interface (UI), wherein the UI is configured to enable a user of the planter system to perform management of the planter apparatus. In yet further aspects, the system may comprise a communication unit configured to communicate with a client device or remote monitoring device. In even further aspects, the controller may be further configured to generate a Graphical User Interface (GUI) presentable on a client device, wherein the GUI is configured to enable a user of the client device to perform management of the planter apparatus. In some aspects, operation and management of the planter apparatus may be controlled by or through a computing device, such by using a mobile application on a client device. The computing device may comprise, but not be limited to, a desktop computer, laptop, tablet, "smart" device, "internet of things" (IoT) device, or mobile telecommunications device, or the like. In further aspects, the planter system may be configured to operate using or be otherwise controlled by various "connected" and automation platforms, such as and without limitation, Google Home and Amazon Alexa.

In various aspects, the disclosed apparatuses, systems, and methods provide numerous advantages over current solutions or plant containers. In further aspects, the disclosed planter apparatuses, systems and methods provide a new method for growing plant indoors. In still further aspects, the inventive design and configuration improve water drainage, and according to some aspects, allows room for the plant to grow. Additional advantages over the current solutions include at least the following:

Drainage: many current planters do not have drip holes which means plants can be over/under watered easily. The disclosed planter apparatus includes drip holes and an integrated drip tray, allowing plants to be fully soaked during watering and then fully drained without worrying that a plant has been over/under watered as well as eliminates standing water.

Water collection reservoir and drip tray: some planters have drip holes requiring unsightly and unsanitary drip trays. When they do, finding a drip tray to fit that prior planter is not easy (not every size/shaped planter comes with a drip tray so you have to find ones and they don't fit with all planters, not to mention the planter design aesthetic). The disclosed planter apparatus and system includes an integrated drip tray that blends into the design aesthetic, and also allows for plants to drain without having standing water that can attract bugs and/or mold, and eliminates the threat of pets drinks the excess water which could contain fertilizer/other substances that could be harmful to pets.

Self-watering: some planters have self-watering mechanism which allow for plant roots to soak up water as needed. This can be good, but they usually result in standing water that can become stagnant, attract bugs and/or mold, and if over watered, the self-watering planters present an issue with removing the excess water. Unlike other planters, the disclosed planter apparatuses and system avoid over watering by virtue of its internal drip tray that allow easy-to-discard water should there be any excess.

Rootbound plants: Most planters are unable to adapt or "grow" with the plant. At some growth stage, a plant will outgrow their planters or require root pruning to prevent plants from becoming rootbound and unhealthy. At this point, new planters must be purchased to allow this plant to grow naturally. The disclosed planter apparatus and system can grow with the plant by virtue of the multiple planting compartments. Once a plant outgrows the initial planting compartment, a second internal and larger planting compartment allows for the plant to be repotted and retain the same exterior shape/size/design at no cost or additional planter pieces (the only thing needed is more soil).

Design, function, and weight: Additionally, indoor planters either are a) lightweight with drip holes that have pretty ordinary designs (i.e., traditional clay pots), b) have interesting designs but are heavier and/or don't have drip holes, or c) focus on design versus function whereas they might be lightweight but the actual planting area isn't functional (mostly due to size of the internal "pot" and lack of drip holes/drainage). The disclosed planter apparatus and system employs both design and function to provide an attractive planter with a virtually invisible drip tray. Furthermore, the inventive design of the present invention address plant growth and design aesthetic: multiple planter depths nested within so that as the plant grows, all you need to do is replant the plant from the initial internal smaller pot to the larger internal pot that it's nested in; and the external planter is a shell/panel that can be changed when the design of your home changes, without having to change the functional planter within. In further aspects, the outer shell/panels are not required to be changeable, and, in some embodiments, may be integrated with or otherwise form part of the housing. To this end, replaceable shells and/or panels may allow for more efficient/simplified manufacturing processes (i.e., a single or limited interior housing configurations can be produced in large quantities, and multiple outer shells having a multitude of designs can be produced to accommodate different seasons, markets, and design aesthetics).

According to various further aspects of the disclosure, the disclosed devices, apparatuses and systems can comprise multiple configurations. In one aspect, disclosed herein is a planter apparatus comprising multiple planting compartments; a water collection reservoir in fluid communication with at least one of the one or more planting compartments; and a water drainage system configured to drain water from the one or more planting compartments into the water collection reservoir. The one or more planting compartments is configured in at least one of: a nested configuration, an interlocking configuration, and a stacked configuration. The water drainage system further comprises a water drainage stopper configured to: open for the flow of water through the water drainage system, and close stopping the flow of water through the water drainage system based on the engagement and disengagement of a water drainage stopper mechanism at the base of the water drainage stopper. In further aspects, the water collection reservoir may further comprise a drawer paddle configured to engage the water drainage stopper mechanism.

In further aspects, various exemplary embodiments of the inventive planter apparatuses, devices, systems, and methods are shown in FIGS. 1-9. FIGS. 1-4 show various views and perspectives of the components of planter system 100 in accordance with an exemplary embodiment. Planter system 100 includes a planter apparatus having a removable first planting compartment 102a removable nested in a second planting compartment 102b, and water collection reservoir 104 in the form of a removable drawer and in fluid communication with second planting compartment. Planter system 100 comprises an integrated water drainage system configured to drain water from first planting compartment into second planting compartment and drain water from second planting compartment into water collection reservoir. As shown in FIG. 1, planting compartments have different volumes, removeable first planting compartment 102a being configured to removably nest or fit within second planting compartment 102b. First planting compartment is in fluid communication with second planting compartment 102b, and second planting compartment 102b is in fluid communication with water collection reservoir 104, such that excess water is drained from first planting compartment 102a to second planting compartment 102b, and then into water collection reservoir 104. In some embodiments, the water drainage system can be further configured to drain water from inside the water collection reservoir to outside. In other embodiments, there may be three or more planting compartments following the aforementioned draining configuration.

In the present embodiment, water drainage system includes first flow control component 106a in the form of drain configured to drain water from first planting compartment into second planting compartment, and second flow control component 106b configured in a drain and valve arrangement for draining water from second planting compartment into the water collection reservoir. Second flow control component 106b is configured to be mechanically actuated from a closed position to an open position. To this end, the open position is configured to allow for the flow of water through, and the closed position is configured to stop the flow of water, and is based on the engagement and disengagement of second flow control component.

Figure 2:
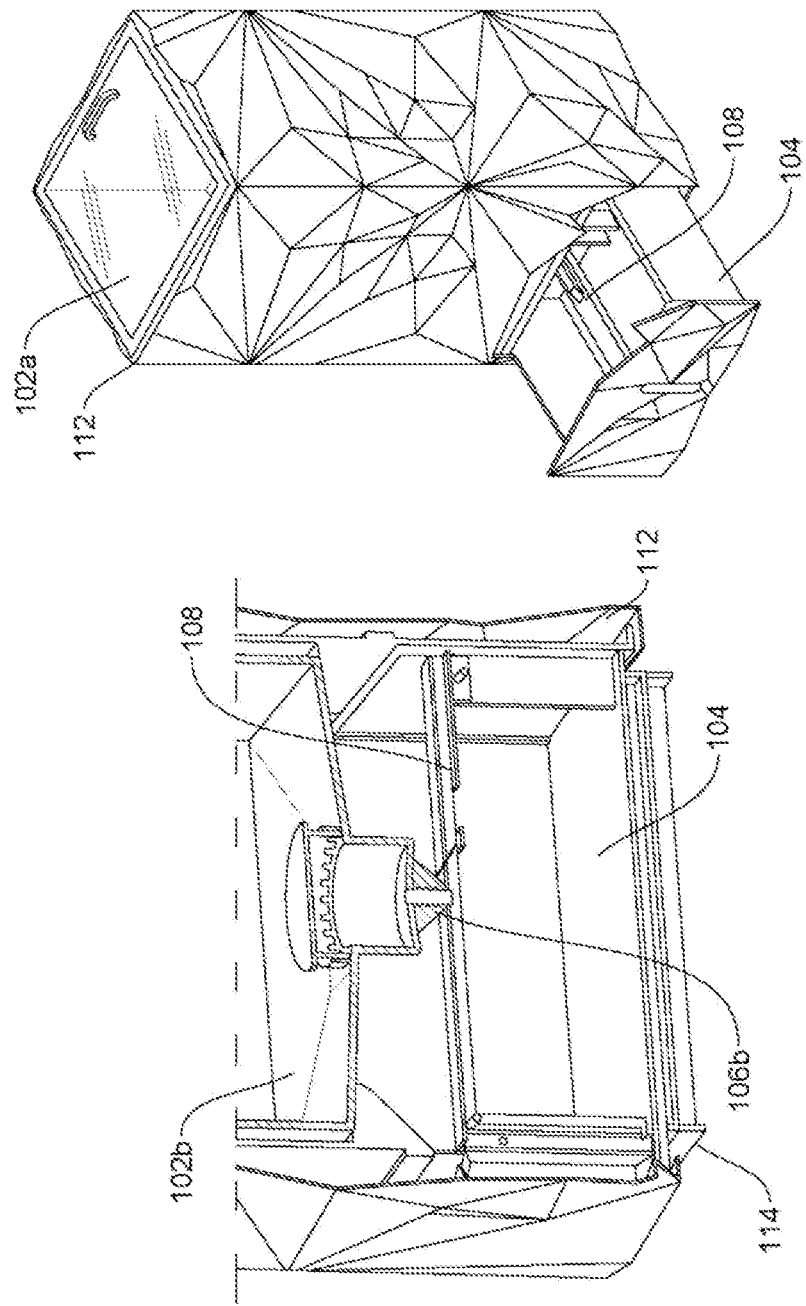
FIG. 2 shows a depiction of a nested planter device in accordance with an exemplary embodiment of the present disclosure.
Figure 3:
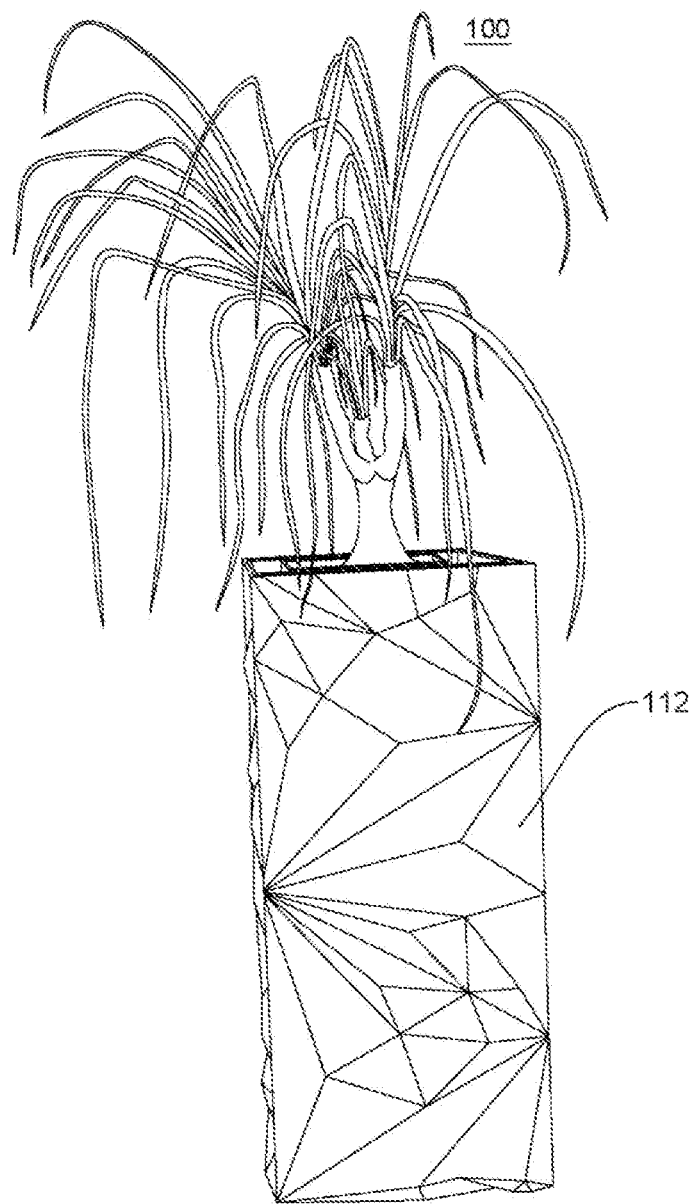
FIG. 3 shows a depiction of a nested planter device in accordance with an exemplary embodiment of the present disclosure.
Figure 4:
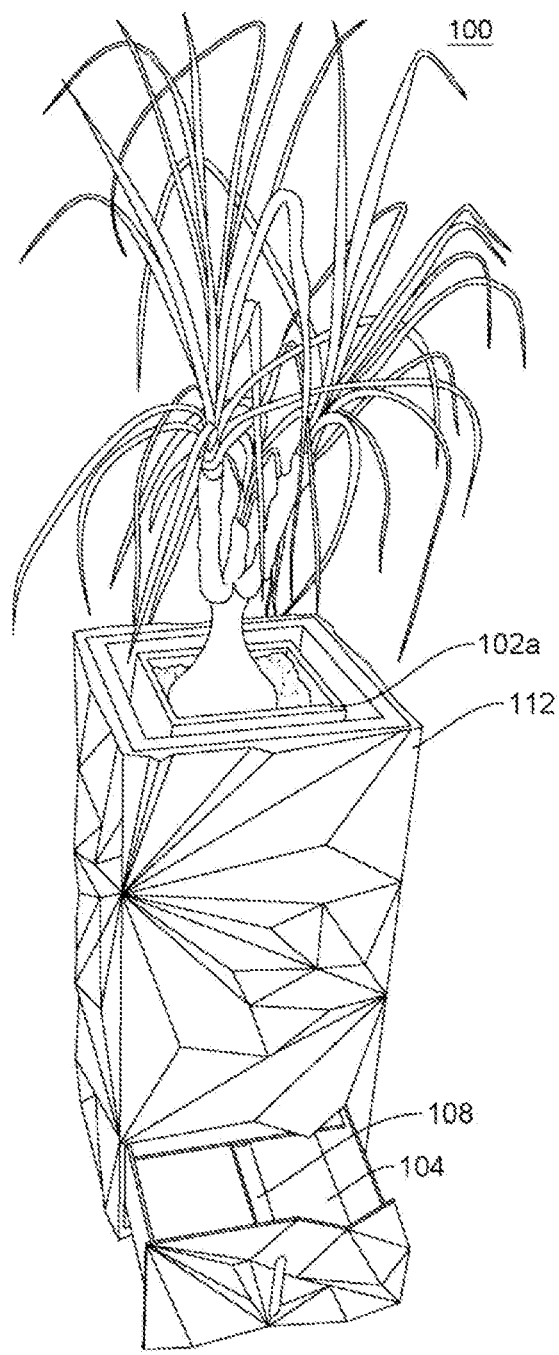
FIG. 4 shows a depiction of a nested planter device in accordance with an exemplary embodiment of the present disclosure.
Figure 5:
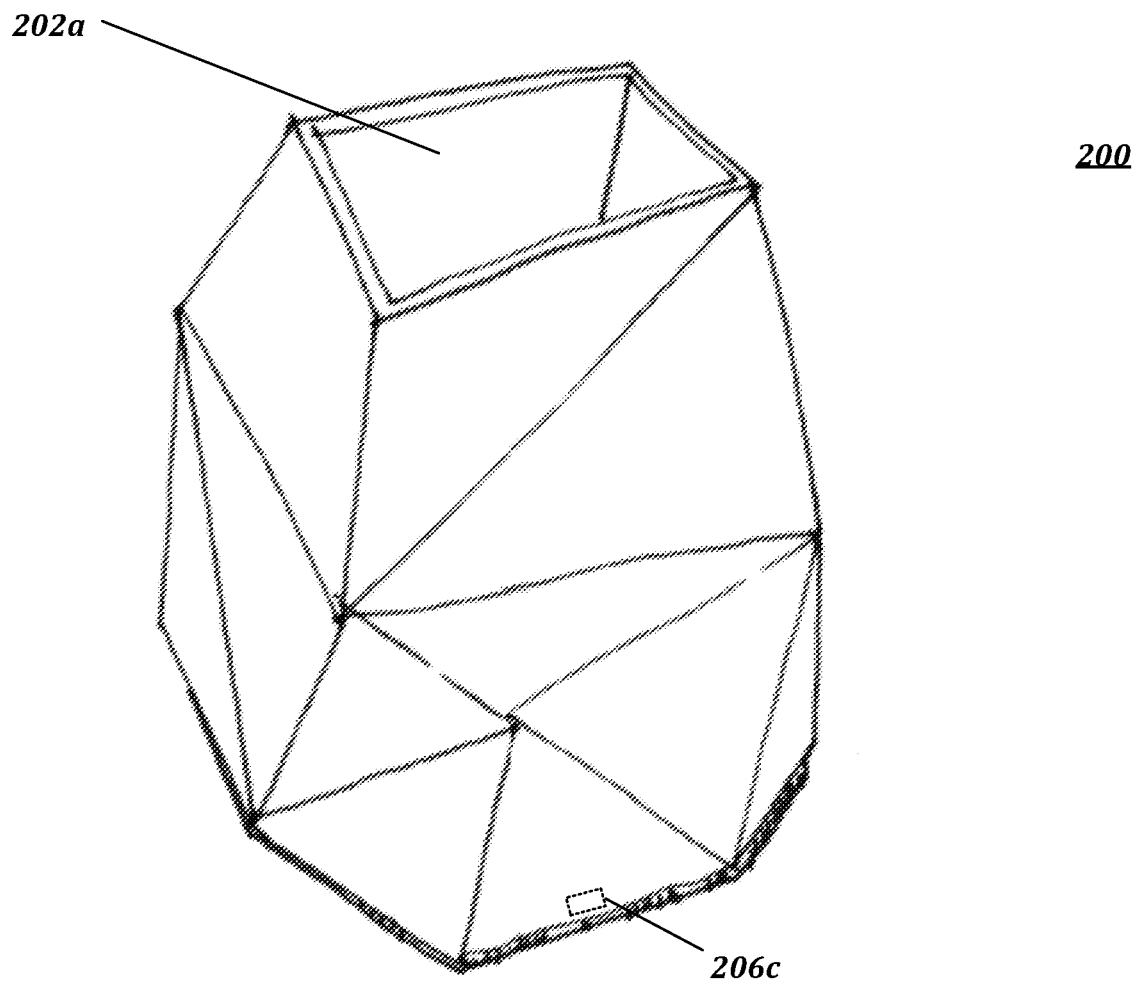
FIG. 5 shows a depiction of a nested planter device in accordance with an exemplary embodiment of the present disclosure.
Figure 6:
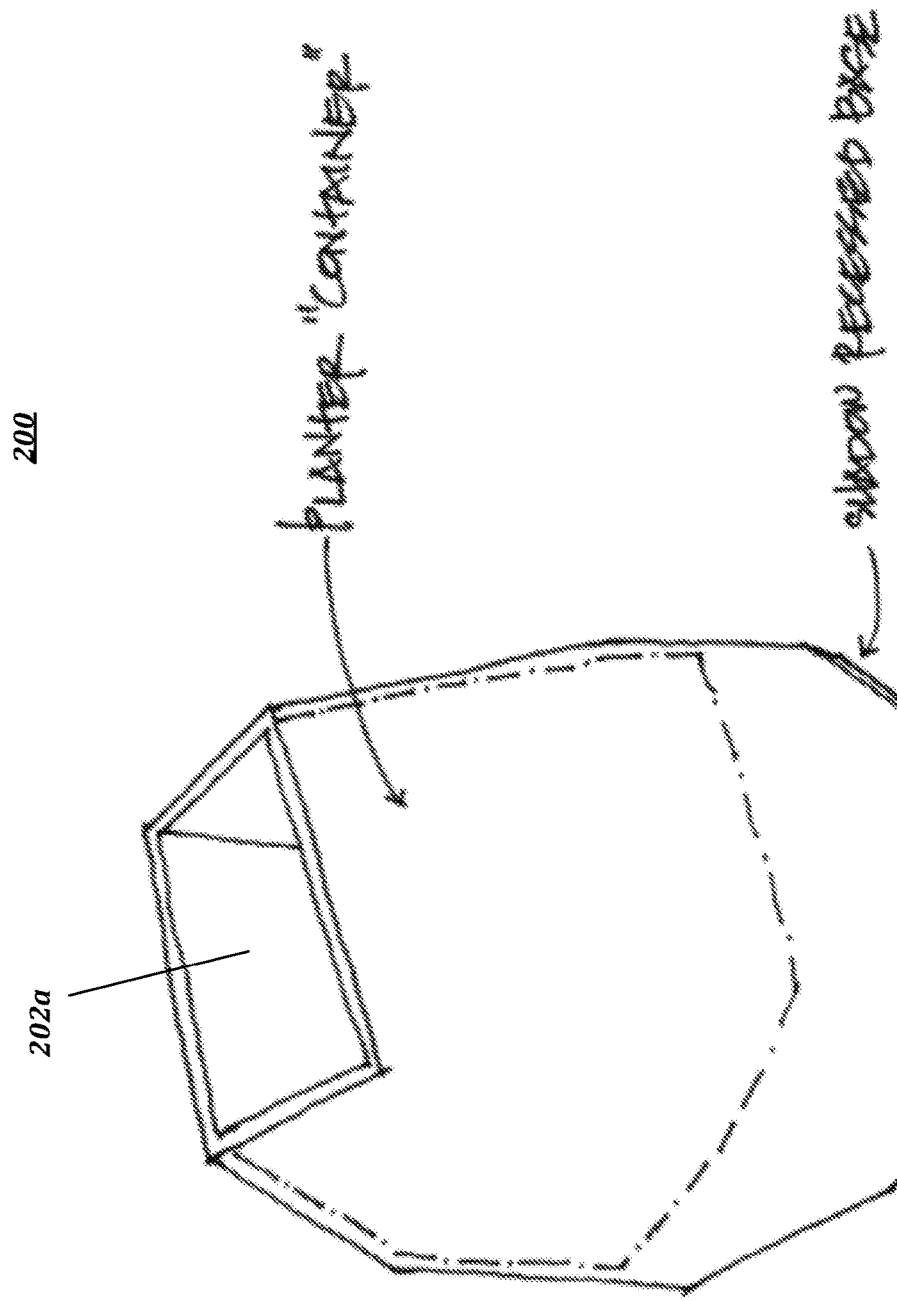
FIG. 6 shows a depiction of a nested planter device in accordance with an exemplary embodiment of the present disclosure.
Figure 7:
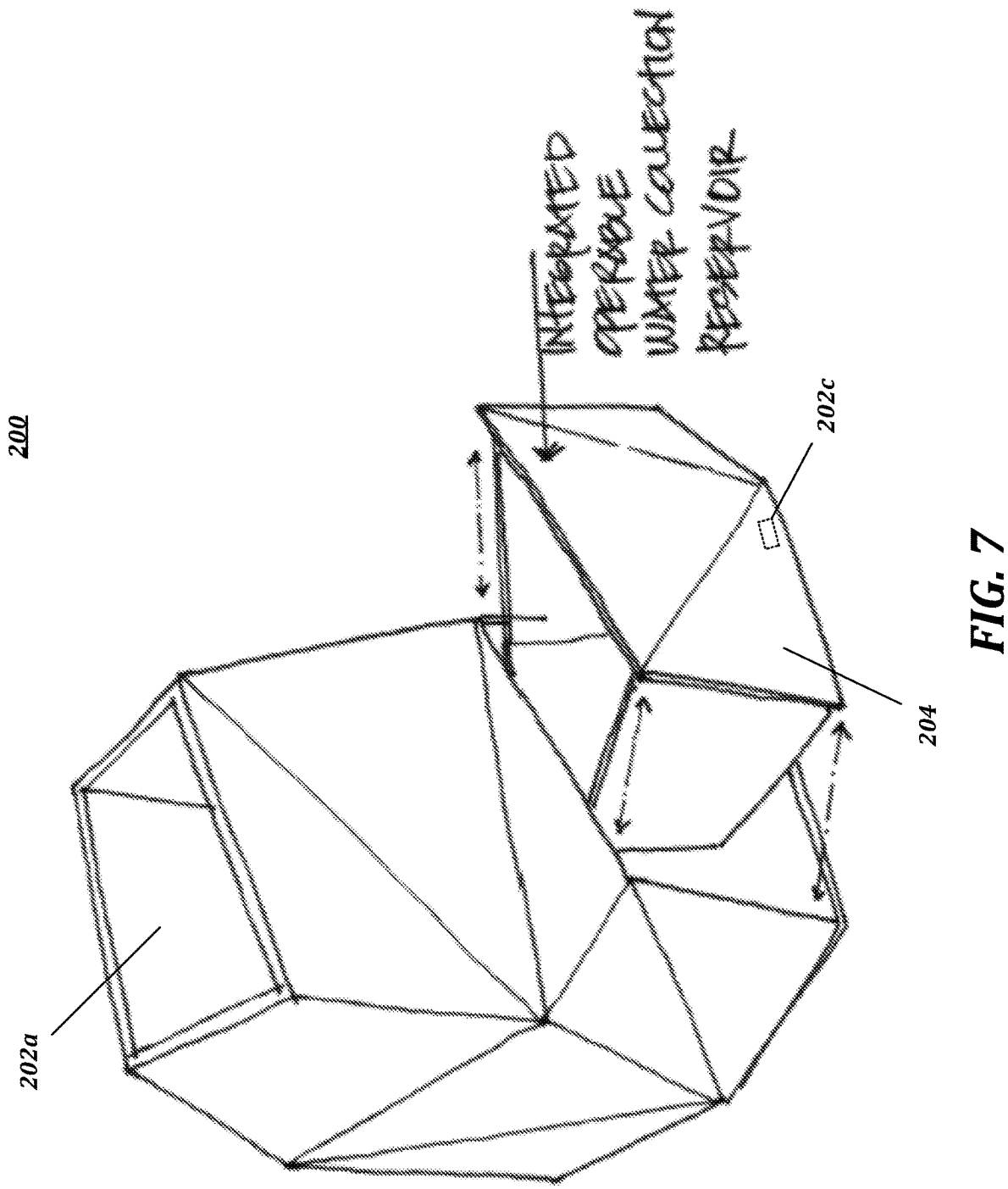
FIG. 7 shows a depiction of a nested planter device in accordance with an exemplary embodiment of the present disclosure.
Figure 8:
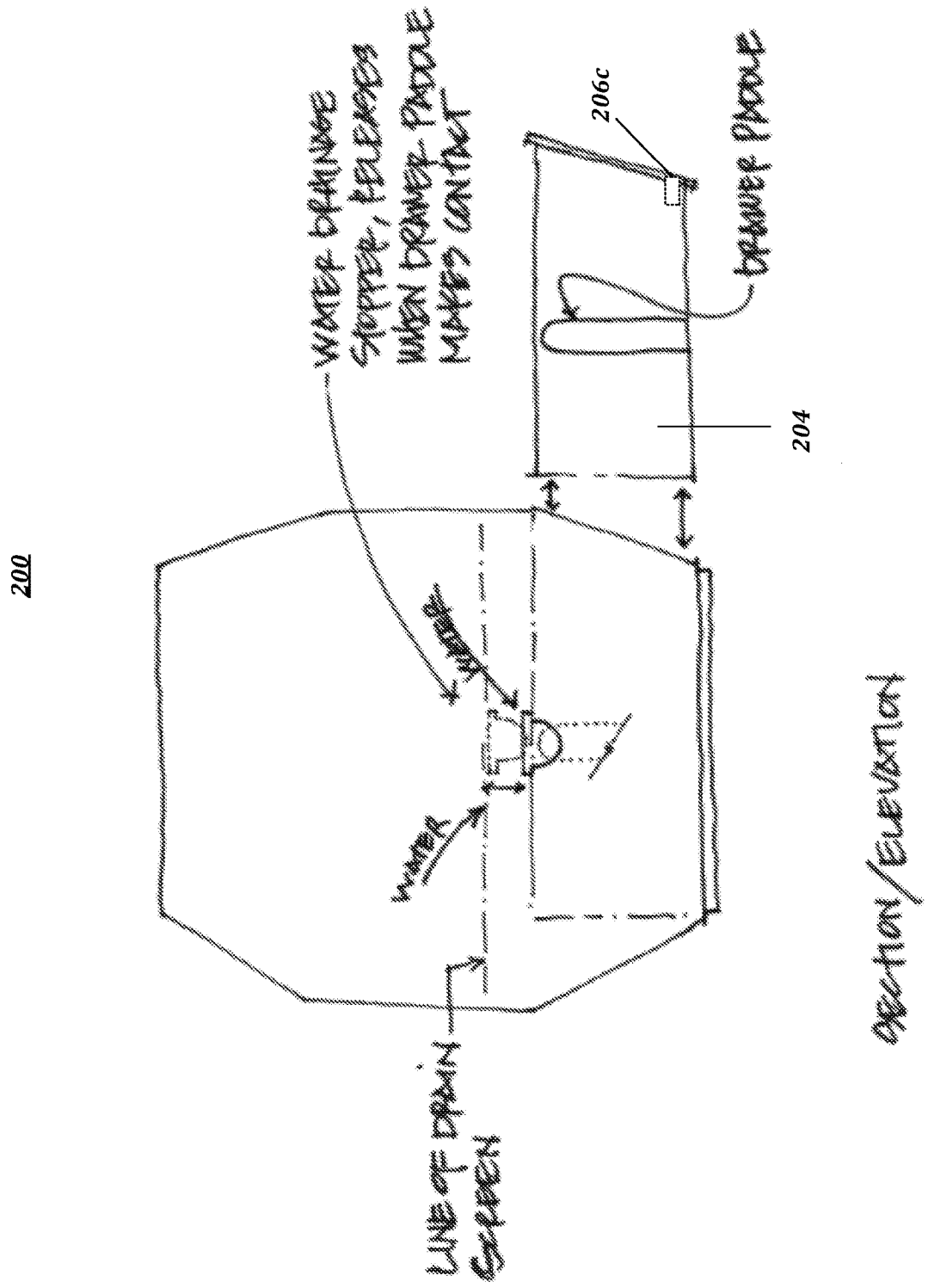
FIG. 8 shows a depiction of a nested planter device in accordance with an exemplary embodiment of the present disclosure.

To this end, water collection reservoir 104 includes paddle member 108 configured to engage and disengage the flow control component, wherein a valve position goes from the open position to the closed position when the drawer is removed from the planter apparatus. As shown in FIG. 2 paddle member 108 includes a central channel to collect water and a relief slot at more distal location to allow the collected water to drain into water collection reservoir. Second flow control component generally comprises a flow control mechanism disposed on the bottom wall of the second planting compartment that prevents water from dripping when water collection reservoir 104 drawer is removed, as well as preventing soil/debris from clogging the drain component. Such a flow control mechanism may include a drain and a valve or stopper configured to stop water flow from the second planting compartment into the water collection reservoir by moving the valve, stopper or other like mechanical component from an open position to a closed position, and may assist in physically dislodging soil from within the drain, such as when moving into and out of the drain flow path during engagement and disengagement.

In further aspects, planter system 100 may include replaceable external housing sleeve or shell 112 that can provide unique design aesthetics and that can be changed to match a user's home décor. Further, the separate, nestable planting compartments allow a user to re-plant a plant that has outgrown smaller first planting compartment, thus avoiding the plant from becoming rootbound as they grow, and without having to change planters. Further, planter system 100 may include base 114 which can be configured for separate attachment of casters to easily move planter apparatus to new locations, which is further enhanced through the use of lightweight materials. Still further, water collection reservoir 104 can allow the plant to be fully soaked and drain naturally without having roots sit in water, which can prevent root rot. Planter system 100 may also include water gauge 116 while to indicate know when to discard excess water.

Figure 9:
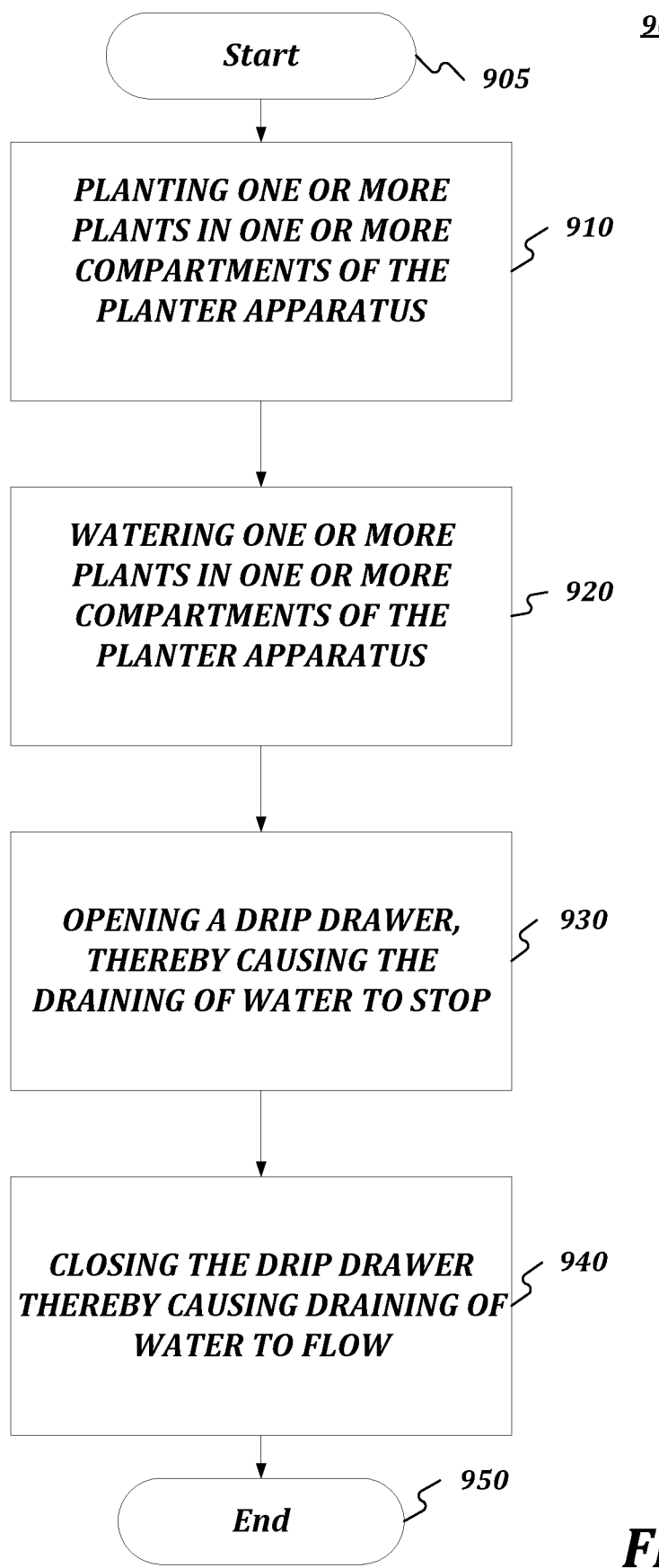
FIG. 9 is a flow chart of a method for providing a nested planter system and apparatus with integrated water collection reservoir drawer.

The present disclosure, according to further aspects, also provides methods of using the disclosed planter apparatuses, devices and systems. In one aspect, FIG. 9 is a flow chart setting forth the general stages involved in a method 900 consistent with an embodiment of the disclosure for using planter system 100. Method 900 may be implemented using planter system 100 as described in more detail below with respect to FIG. 1. Although method 900 has been described to be performed by planter system 100, it should be understood that, in some embodiments, different operations may be performed by different elements coupled with planter system 100. For example, planter system 100 may be employed in the performance of some or all of the stages in method 900. Similarly, other planter apparatus embodiments disclosed herein may be employed in the performance of some or all of the stages in method 900.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 900 will be described in greater detail below.

Method 900 may begin at starting block 905 and proceed to stage 910 where planter system 100 may be used by a user to plant one or more plants in a first planting compartment of planter system 100. For example, a small palm tree or plant may be planted in the first planting compartment which can then be nested in the larger, second planting compartment.

From stage 910, where nested planter system 100 is used by a user to plant one or more plants in first planting compartments of planter system 100, method 900 may advance to stage 920 where planter system 100 may be watered by pouring water onto the one or more plants planted in planter system 100. For example, water may be provided to the plant on a schedule. Once planter system 100 is watered by pouring water onto the planted plants in planter system 100 in stage 920, method 900 may continue to stage 930 where a user of the planter system 100 may disengage the water drainage system by opening the water collection reservoir drawer. For example, removing the water collection reservoir drawer, for example to empty, may cause a flow control component to stop water from flowing from the above planting compartment, such as by disengagement of an actuator keeping a drain or valve open.

After the user of planter system 100 disengages the water drainage system by opening the water collection reservoir drawer in stage 930, method 900 may proceed to stage 940 where the user of may engage the water drainage system by inserting the water collection reservoir drawer back in. For example, closing the water collection reservoir drawer may cause a stopper to release and allow the water to drain into the water collection drawer. Once the user of planter system 100 engages the water drainage system by closing the water collection reservoir drawer in stage 940, method 900 may then end at stage 950. When the plant has outgrown the first planting compartment, the first planting compartment can be removed and replanted in the larger, second planting compartment.

The present disclosure includes at least the following aspects: Aspect 1: A planter system comprising: a planter apparatus comprising: one or more planting compartments, a water collection reservoir in fluid communication with at least one of the one or more planting compartments; and a water drainage system configured to drain water from one planting compartment into another planting compartment, drain water from one planting compartment into the water collection reservoir, or drain water from inside the water collection reservoir to outside the water collection reservoir, or a combination thereof.

Aspect 2: The planter system of any preceding aspect, wherein the water drainage system comprises at least one flow control component.

Aspect 3: The planter system of any preceding aspect, wherein the water drainage system comprises a plurality of flow control components.

Aspect 4: The planter system of any preceding aspect, wherein the water drainage system comprises a flow control component configured to drain water from one planting compartment into another planting compartment, a flow control component configured to drain water from one planting compartment into the water collection reservoir, or a flow control component configured to drain water from inside the water collection reservoir to outside the water collection reservoir, or a combination thereof.

Aspect 5: The planter system of any preceding aspect, wherein the water drainage system comprises a first flow control component configured to drain water from the one or more planting compartments into the water collection reservoir and a second flow control component configured to drain water from inside the water collection reservoir to outside the water collection reservoir.

Aspect 6: The planter system of any preceding aspect, wherein the flow control component comprises a drain to control a flow of water from within a planting compartment and/or water collection reservoir.

Aspect 7: The planter system of any preceding aspect, wherein the flow control component comprises a drain and a valve configured to control a flow of water flowing from the one or more planting compartments by moving a valve position from an open position to a closed position.

Aspect 8: The planter system of any preceding aspect, wherein the flow control component comprises an actuator in mechanical communication with the valve and configured to actuate the valve from an open position to a closed position and/or from a closed position to an open position.

Aspect 9: The planter system of any preceding aspect, wherein the open position is configured to allow for the flow of water through the water drainage system, and the closed position is configured to stop the flow of water through the water drainage system based on the engagement and disengagement of the flow control component.

Aspect 10: The planter system of any preceding aspect, wherein the water collection reservoir further comprises a drawer paddle configured to engage and disengage the flow control component.

Aspect 11: The planter system of any preceding aspect, wherein the flow control component is configured to move the valve position from the open position to the closed position when the drawer is removed from the planter apparatus.

Aspect 12: The planter system of any preceding aspect, wherein the flow control component comprises a removable stopper and drain disposed on a wall of the water collection reservoir and configured to allow flow of water from within the water collection reservoir to outside the water collection reservoir.

Aspect 13: The planter system of any preceding aspect, wherein the one or more planting compartments are configured in at least one of: a nested configuration, an interlocking configuration, and a stacked configuration.

Aspect 14: The planter system of any preceding aspect, further comprising a plurality of planting compartments.

Aspect 15: The planter system of any preceding aspect, wherein each planting compartment comprises side and bottom walls defining a predetermined volume.

Aspect 16: The planter system of any preceding aspect, wherein each planting compartment of the plurality of planting compartments are connected to at least one of: another planting compartment or water collection reservoir.

Aspect 17: The planter system of any preceding aspect, wherein at least one planting compartment comprises a drain disposed on the bottom wall and configured to allow flow of water from within the planting compartment into another planting compartment.

Aspect 18: The planter system of any preceding aspect, wherein the plurality of planting compartments is configured to connect to one another in a nested configuration, an interlocking configuration, and a stacked configuration.

Aspect 19: The planter system of any preceding aspect, wherein each of the plurality of planting compartments have different volumes.

Aspect 20: The planter system of any preceding aspect, comprising a first planting compartment configured to nest or fit within a second planting compartment.

Aspect 21: The planter system of any preceding aspect, wherein the first planting compartment is in fluid communication with the second planting compartment.

Aspect 22: The planter system of any preceding aspect, wherein the second planting compartment is in fluid communication with the water collection reservoir.

Aspect 23: The planter system of any preceding aspect, wherein the second planting compartment is in fluid communication with the water collection reservoir.

Aspect 24: The planter system of any preceding aspect, wherein the second planting compartment comprises a flow control component disposed on a bottom wall, the flow control component comprising a drain and a valve configured to control a flow of water flowing from the second planting compartment into the water collection reservoir by moving a valve position from an open position to a closed position.

Aspect 25: The planter system of any preceding aspect, wherein at least one planting compartment is configured to drain water from said planting compartment into another planting compartment.

Aspect 26: The planter system of any preceding aspect, wherein at least one planting compartment comprises a flow control component disposed on a bottom wall, the flow control component comprising a drain configured allow a flow of water from said planting compartment into another planting compartment.

Aspect 27: The planter system of any preceding aspect, wherein at least one planting compartment comprises a drain disposed on a bottom wall configured allow a flow of water from said planting compartment into another planting compartment.

Aspect 28: The planter system of any preceding aspect, wherein the flow control component comprises an actuator in mechanical communication with the valve and configured to actuate the valve from a closed position to an open position to allow flow of water from within the second planting compartment.

Aspect 29: The planter system of any preceding aspect, wherein the valve is configured to be in the closed position in the absence of engagement of the actuator, and is configured to allow for the flow of water through the water drainage system, and the closed position is configured to stop the flow of water through the water drainage system based on the engagement and disengagement of the flow control component.

Aspect 30: The planter system of any preceding aspect, wherein the water collection reservoir comprises a drawer configured to be removably inserted into the planter apparatus.

Aspect 31: The planter system of any preceding aspect, wherein the drawer comprises an elongated member and/or paddle configured to cooperate with the flow control component to control flow of water from within the planting compartment.

Aspect 32: The planter system of any preceding aspect, wherein the drawer comprises an elongated member and/or paddle configured to cause the valve position to move from the closed position to the open position by actuating the actuator when the drawer is inserted into the planter apparatus.

Aspect 33: The planter system of any preceding aspect, wherein the water collection reservoir comprises a water gauge for showing a water level within the water collection reservoir.

Aspect 34: The planter system of any preceding aspect, wherein the plater apparatus comprises a housing for containing the one or more planting compartments, water collection reservoir and water drainage system.

Aspect 35: The planter system of any preceding aspect, further comprising an outer shell configured to removably attach to an outer surface of the planter apparatus.

Aspect 36: The planter system of any preceding aspect, further comprising at least one moisture sensor configured to determine moisture data associated with at least one planting compartment.

Aspect 37: The planter system of any preceding aspect, further comprising at least one water level sensor configured to determine water level data associated with the water collection reservoir.

Aspect 38: The planter system of any preceding aspect, further comprising a controller communicatively connected to the sensors and configured to at least one of: communicate moisture data and/or water level data, or control operation of the valve based at least on at least one of the moisture data or water level data.

Aspect 39: The planter system of any preceding aspect, wherein the moisture sensor is configured to communication a notification upon meeting predetermined moisture criteria associated with one or more planting compartments.

Aspect 40: The planter system of any preceding aspect, wherein the water level sensor is configured to communication a notification upon meeting predetermined water level criteria associated with the water collection reservoir.

Aspect 41: The planter system of any preceding aspect, wherein the controller is configured to communicate a notification upon meeting predetermined criteria; wherein the predetermined criteria is based on one or more of moisture data received from a moisture sensor or water level data received from a water level sensor.

Aspect 42: The planter system of any preceding aspect, wherein the controller is configured to cause the valve position to be in a closed position when water level data received from the at least one water level sensor is above a predetermined threshold.

Aspect 43: The planter system of any preceding aspect, further comprising a display unit configured to show information related to planter apparatus status, settings, parameters, or performance, or a combination thereof.

Aspect 44: The planter system of any preceding aspect, wherein the display unit is further configured to generate a user interface (UI), wherein the UI is configured to enable a user of the planter system to perform management of the planter apparatus.

Aspect 45: The planter system of any preceding aspect, further comprising a communication unit configured to communicate with a client device or remote monitoring device.

Aspect 46: The planter system of any preceding aspect, wherein the controller is further configured to generate a Graphical User Interface (GUI) presentable on a client device, wherein the GUI is configured to enable a user of the client device to perform management of the planter apparatus.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

The following is claimed:

1. A soil-based planter system comprising:
    a planter housing configured to protect the planter system from external elements;
    one or more outer shell panels, each of the one or more outer shell panels being independently and removably attachable to the planter housing to completely cover an outer surface of the planter housing;
    one or more removeable planting compartments arranged in a nested, interlocked, or stacked configuration within the planter housing, each of the one or more removable planting compartments being configured to retain soil and at least one plant;
    a water collection reservoir in fluid communication with at least one of the one or more of the planting compartments to remove excess water from the one or more planting compartments,
    wherein the water collection reservoir can be removed from the planter housing without interfering with the one or more removeable planting compartments;
    a water drainage system comprising at least one water drainage valve configured to control flow of the excess water between the one or more planting compartments, control the flow of the excess water from one planting compartment into the water collection reservoir, or control the flow of the excess water from inside the water collection reservoir to outside the water collection reservoir, or a combination thereof, and
    a paddle configured to cause the at least one water drainage valve to move between an open position and a closed position based on a position of the water collection reservoir, wherein the at least one water drainage valve is configured to control the flow of the excess water based on the water collection reservoir being removed from the planter housing and without moving the one or more removeable planting compartments.

2. The planter system of claim 1, wherein the water drainage system comprises at least one water drainage valve configured to drain water from one planting compartment into another planting compartment, at least one water drainage valve configured to drain water from one planting compartment into the collection reservoir, or at least one water drainage valve configured to drain water from inside the water collection reservoir to outside the water collection reservoir, or a combination thereof.

3. The planter system of claim 2, wherein the water drainage system comprises a first water drainage valve configured to drain water from the one or more planting compartments into the water collection reservoir and a second water drainage valve configured to drain water from inside the water collection reservoir to outside the water collection reservoir.

4. The planter system of claim 2, wherein the at least one water drainage valve comprises an actuator in mechanical communication with the paddle and configured to actuate the valve from the open position to the closed position and/or from the closed position to the open position,
    wherein the water collection reservoir actuates the actuator to configure the valve in the open position when the water collection reservoir is inserted in the planter housing, and wherein the water collection reservoir actuates the actuator to configure the valve in the closed position upon removal of the water collection reservoir from the planter housing.

5. The planter system of claim 4, wherein the open position is configured to allow for the flow of water through the at least one water drainage valve, and the closed position is configured to stop the flow of water through the water drainage valve based on the position of the at least one water drainage valve.

6. The planter system of claim 5, further comprising a plurality of planting compartments; wherein the one or more planting compartments further comprise at least one of: a planting container, a media container, and a conventional container capable of storing soil-based plant media.

7. The planter system of claim 6, wherein a first planting compartment is in fluid communication with a second planting compartment.

8. The planter system of claim 7, wherein the second planting compartment comprises one of the at least one water drainage valve disposed on a bottom wall, configured to control a flow of water flowing from the second planting compartment into the water collection reservoir by moving a valve position from an open position to a closed position.

9. The planter system of claim 8, wherein at least one of the at least one water drainage valve comprises the actuator in mechanical communication with the paddle and configured to actuate the valve from a closed position to an open position to allow flow of water from within the plurality of planting compartments.

10. The planter system of claim 9, wherein the valve is configured to be in the closed position, wherein the actuator allows for the flow of water through the water drainage system, wherein the closed position is configured to stop the flow of water through the water drainage system based on engagement and disengagement of the at least one water drainage valve.

11. The planter system of claim 10, wherein the water collection reservoir comprises a drawer configured to be removably inserted into the planter housing.

12. The planter system of claim 11, wherein the drawer comprises an elongated member configured to cooperate with the paddle and the at least one water drainage valve to control flow of water from within at least one of the plurality of planting compartments.

13. The planter system of claim 12, wherein the drawer comprises an elongated member configured to cause the valve position to move from the closed position to the open position by actuating the actuator when the drawer is inserted into the planter housing.

14. The planter system of claim 13, wherein the water collection reservoir comprises a second flow control component comprising a removable stopper and drain disposed on a wall of the water collection reservoir and configured to allow flow of water from within the water collection reservoir to outside the water collection reservoir.

15. The planter system of claim 12, wherein the planter housing comprises a housing for containing the one or more planting compartments, water collection reservoir and water drainage system.

16. The planter system of claim 6, wherein at least one planting compartment comprises the at least one water drainage valve disposed on a bottom wall, the at least one water drainage valve comprising a drain configured allow a flow of water from said planting compartment into another planting compartment.

17. A soil-based planter system comprising:
a planter housing configured to protect the planter system from external elements;
one or more outer shell panels, each of the one or more outer shell panels being independently and removably attachable to the planter housing to completely cover an outer surface of the planter housing;
one or more planting compartments arranged in a nested, interlocked, or stacked configuration within the planter housing, each of the one or more removable planting compartments being configured to retain soil and at least one plant;
a water collection reservoir in fluid communication with at least one of the one or more planting compartments to remove excess water from the one or more planting compartments,
wherein the water collection reservoir can be removed from the planter housing without interfering with the one or more planting compartments; and
a water drainage system including a valve configured to control flow of the excess water from one planting compartment into another planting compartment, control the flow of the excess water from one planting compartment into the water collection reservoir, or control the flow of the excess water from inside the water collection reservoir to outside the water collection reservoir, or a combination thereof,
a paddle configured to cause the valve to move between an open position and a closed position based on a position of the water collection reservoir, wherein the valve is configured to control the flow of excess water based on the water collection reservoir being removed from the planter housing and without moving the one or more removable planting compartments;
wherein the water drainage system comprises a first flow control component configured to drain water from the one or more planting compartments into the water collection reservoir and a second flow control component configured to drain water from inside the water collection reservoir to outside the water collection reservoir, the first flow control component comprising a drain and a valve configured to control a flow of water flowing from the second planting compartment into the water collection reservoir by moving a valve position from an open position to a closed position; and
wherein the water collection reservoir comprises a drawer integrated into the planter housing configured to be removably inserted into the planter system; the drawer including an elongated member configured to cooperate with the flow control component to control flow of water from within the planting compartment to the collection reservoir by causing a valve position of a first flow control component to move from the closed position to the open position by actuating an actuator when the drawer is inserted into the planter system, and wherein removal of the drawer causes the valve position to move from the open position to the closed position when the drawer is removed from the planter system.

18. The planter system of claim 17, wherein the water collection reservoir comprises the second flow control component comprising a removable stopper and drain disposed on a wall of the water collection reservoir and configured to allow flow of water from within the water collection reservoir to outside the water collection reservoir.

* * * * *